United States Patent [19]

Torcomian

[11] Patent Number: 4,993,737
[45] Date of Patent: Feb. 19, 1991

[54] LOAD-BEARING MULTI-POSITION DRAWBAR ARRANGEMENT AND SUSPENSION SYSTEM

[75] Inventor: Albert Torcomian, Havertown, Pa.

[73] Assignee: Magna Van Systems, Inc., Norristown, Pa.

[21] Appl. No.: 385,251

[22] Filed: Jul. 25, 1989

[51] Int. Cl.⁵ .......................... B60D 1/42; B62D 53/08
[52] U.S. Cl. ............................... 280/407; 280/407.1; 280/476.1; 280/149.2
[58] Field of Search ............... 280/80.1, 81.1, 149.2, 280/407, 407.1, 476.1, 482; 180/209

[56] References Cited

U.S. PATENT DOCUMENTS

| | | | |
|---|---|---|---|
| 2,860,891 | 11/1958 | Ramun | 280/149.2 X |
| 2,900,194 | 8/1959 | DeLay | 280/149.2 X |
| 3,087,741 | 4/1963 | DeLay | 280/149.2 X |
| 3,393,922 | 7/1968 | Adams | 280/476.1 X |
| 3,476,405 | 11/1969 | Cunha | 280/476.1 |
| 3,834,736 | 9/1974 | Dodgson | 280/407 |
| 3,900,213 | 8/1975 | Cunha | 280/407 |
| 4,230,335 | 10/1980 | Glassmeyer | 280/476.1 |
| 4,286,797 | 9/1981 | Mekosh, Jr. et al. | 280/149.2 |
| 4,353,565 | 10/1982 | Smith et al. | 280/149.2 |
| 4,557,497 | 12/1985 | Rumminger | 280/149.2 X |
| 4,598,924 | 7/1986 | Arguin | 280/407.1 X |
| 4,738,462 | 4/1988 | Adams | 280/407 |
| 4,759,563 | 7/1988 | Nash | 280/407 X |
| 4,830,392 | 5/1989 | Torcomian | 280/407.1 X |
| 4,838,566 | 6/1989 | Baxter et al. | 280/149.2 |

FOREIGN PATENT DOCUMENTS 1171216  1/1959  France .................. 280/407.1

*Primary Examiner*—Charles A. Marmor
*Assistant Examiner*—Brian L. Johnson
*Attorney, Agent, or Firm*—Steinberg & Raskin

[57] ABSTRACT

Two wheeled units of a vehicle are adjustably interconnectably positioned relative to each other. An apertured track assembly is stationarily mounted on one of the units, while a locking assembly is mounted on the other of the units. The locking assembly includes at least one locking pin displaceable into and out of at least one aperture on the track assembly. The locking assembly may be unlocked either manually or with power assistance. The two wheeled units may be leading and trailing cargo units of a vehicle whose spacing apart from each other is to be controlled in a load-bearing drawbar arrangement. Alternatively, the wheeled units may be a bogie subframe mounted underneath a cargo unit and movable relative thereto for better weight distribution of the payload in a suspension system.

30 Claims, 8 Drawing Sheets

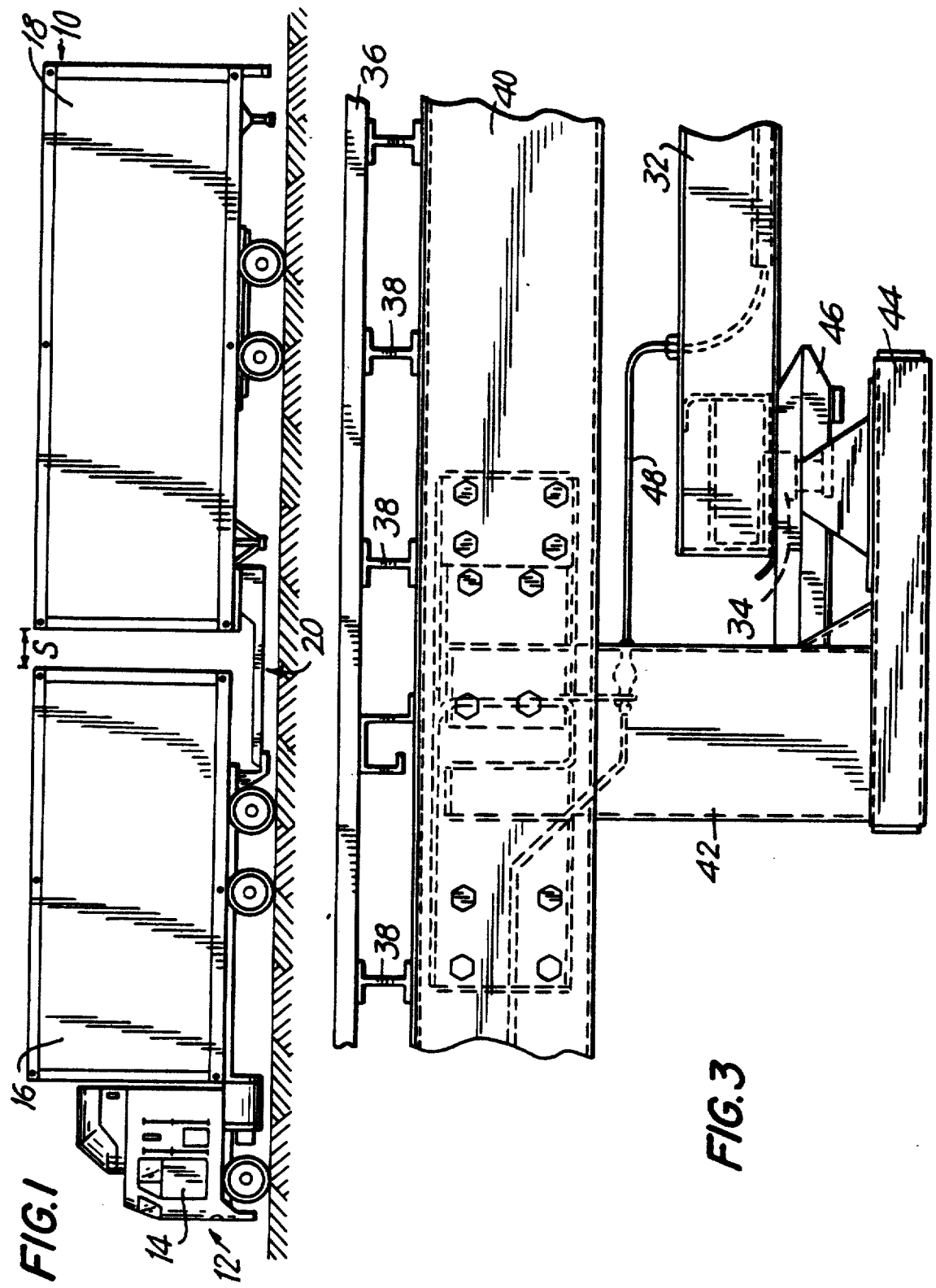

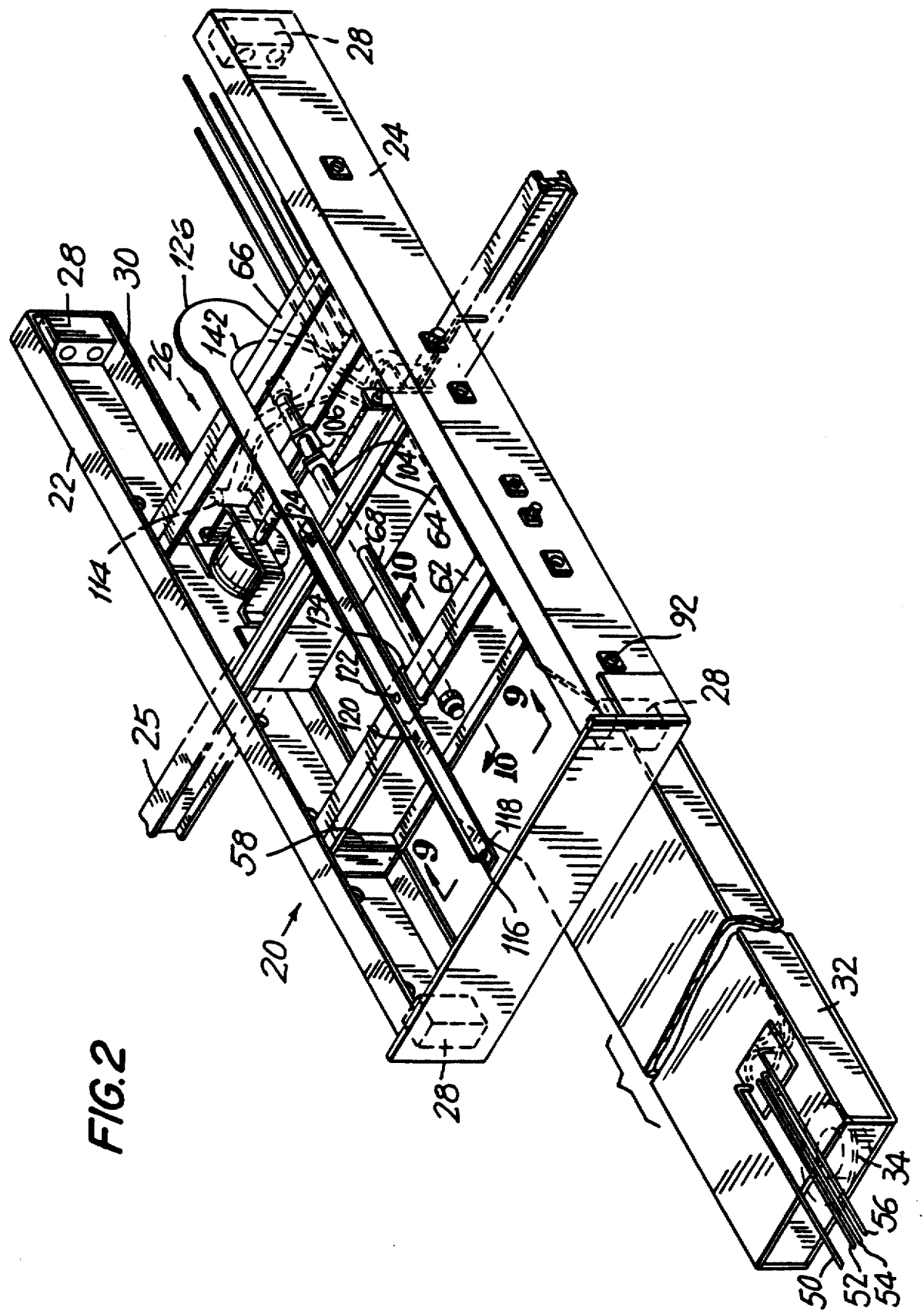

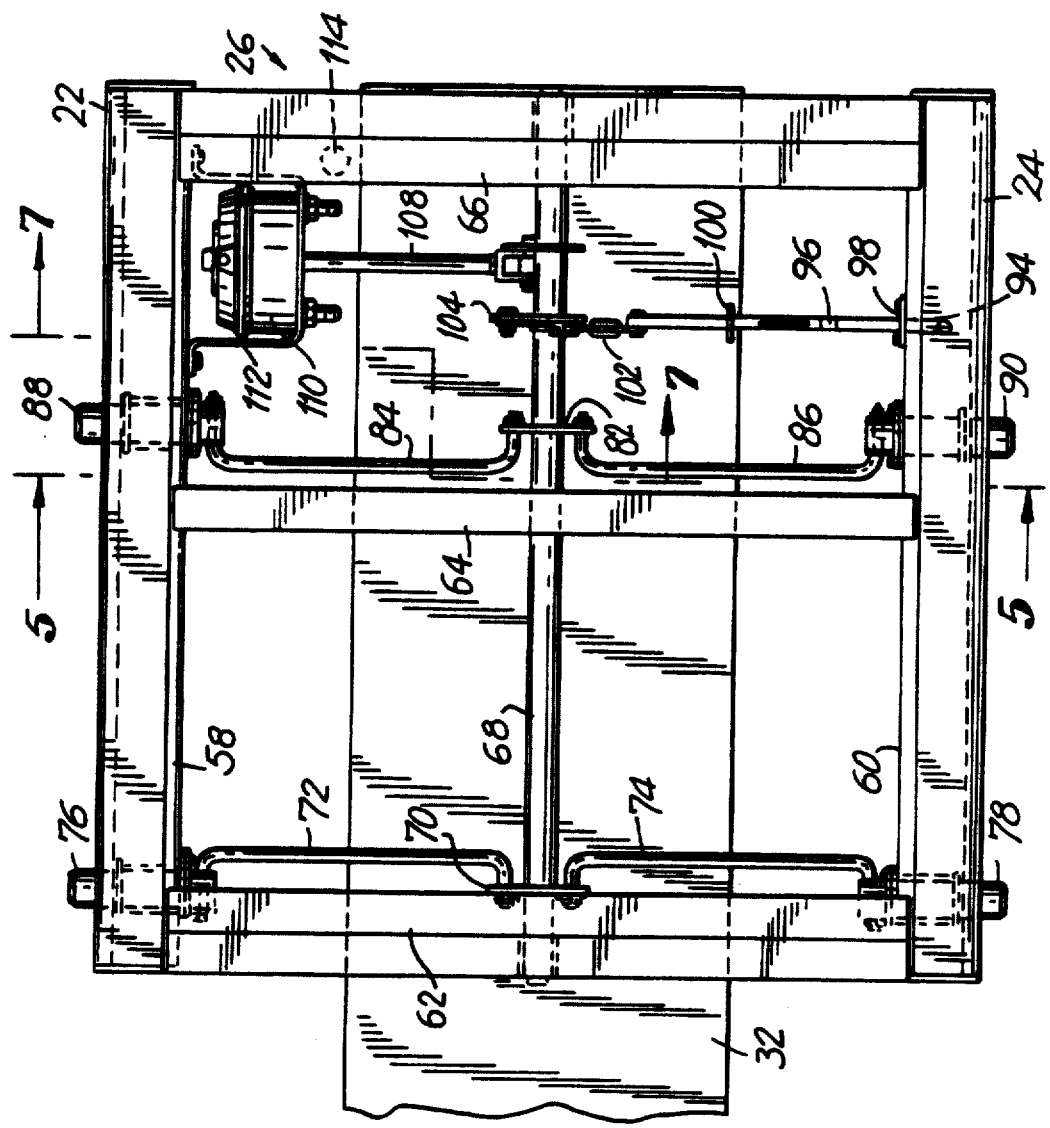

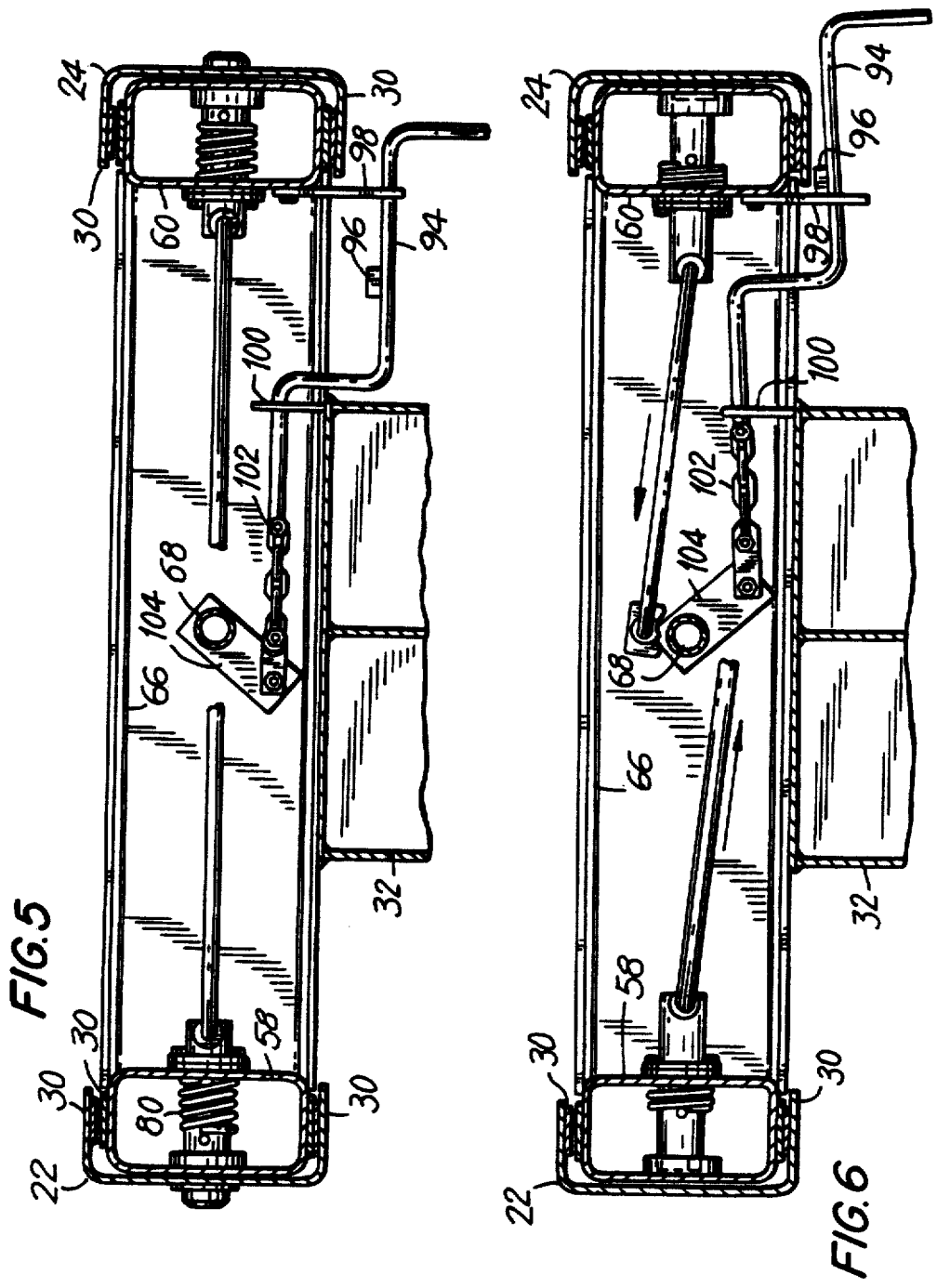

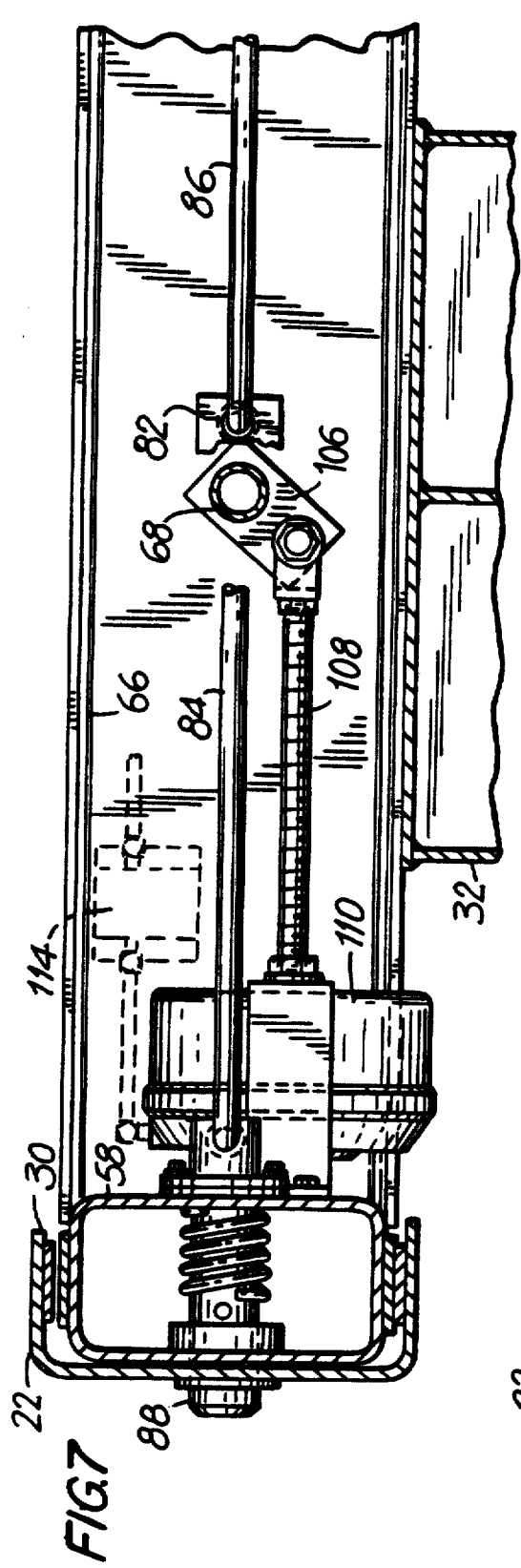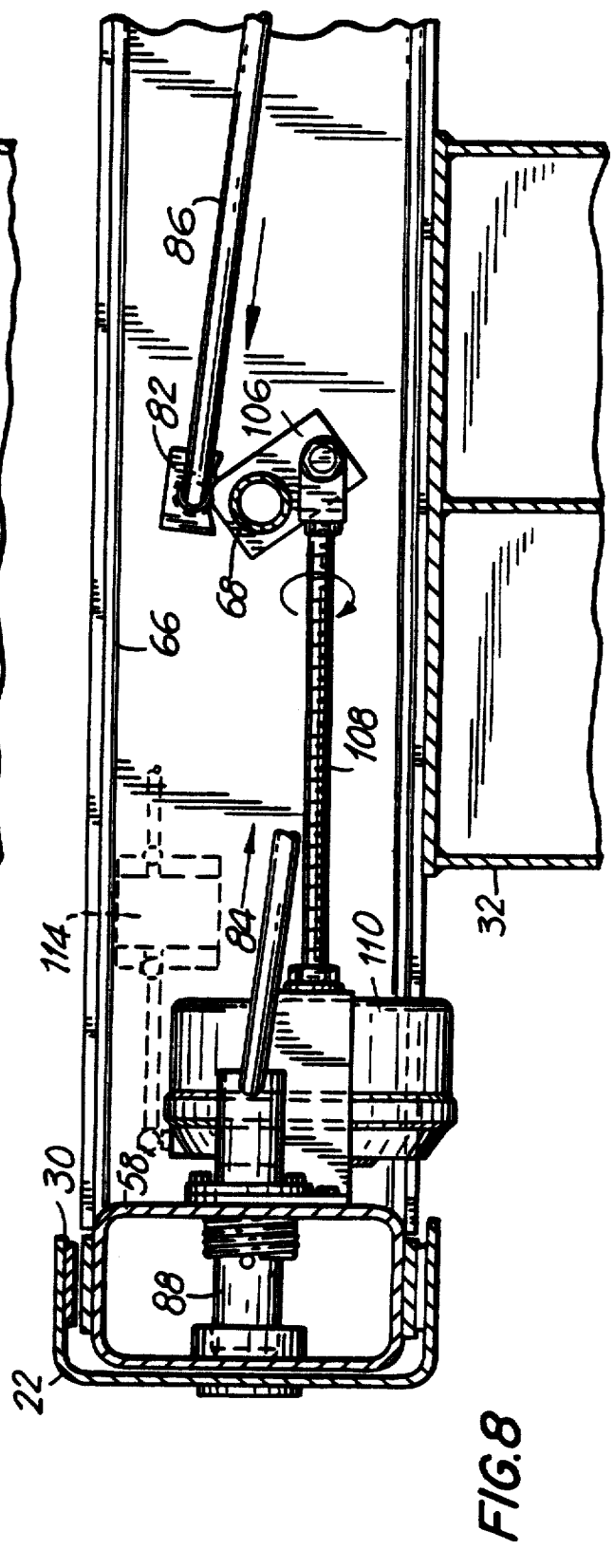

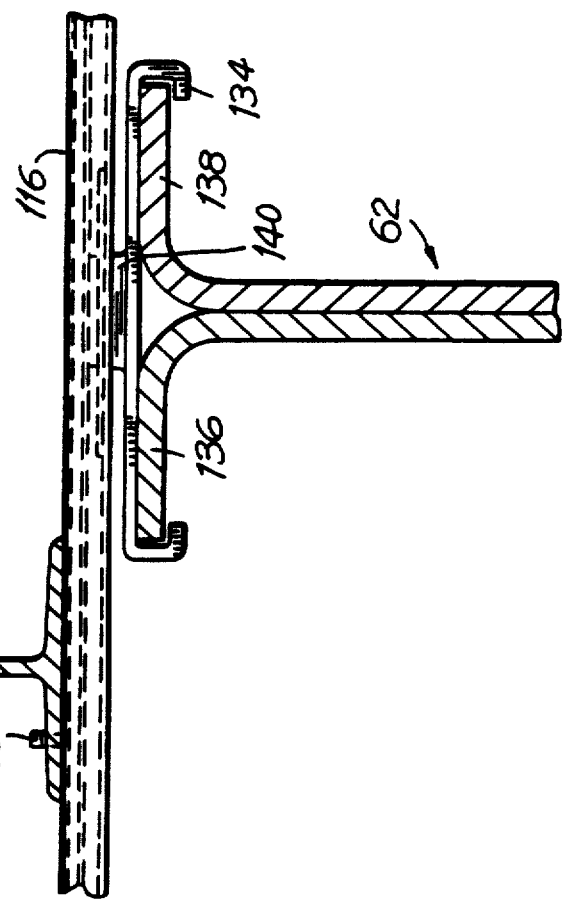
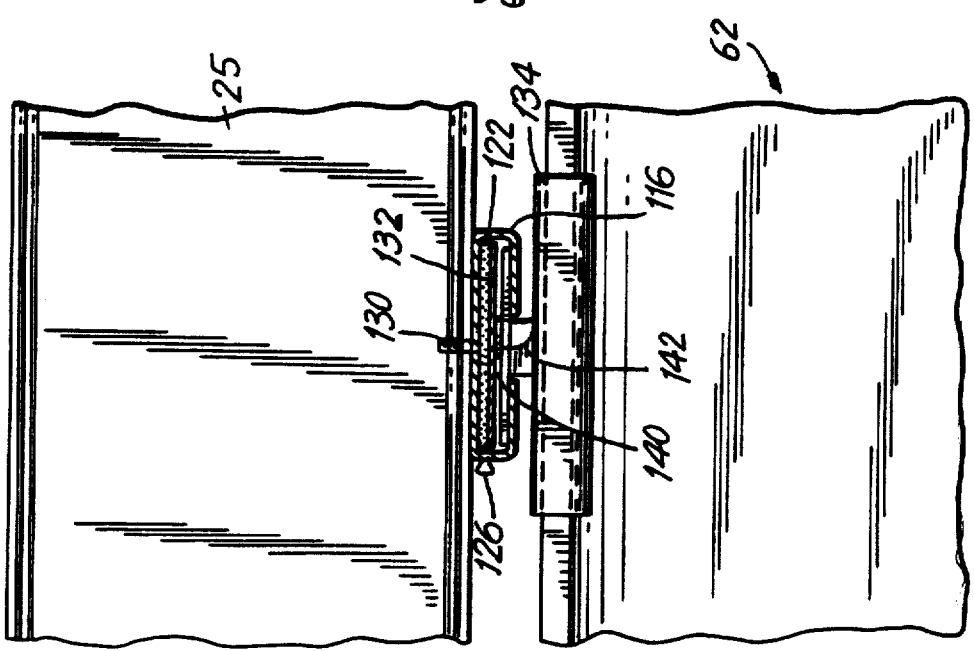

LOAD-BEARING MULTI-POSITION DRAWBAR ARRANGEMENT AND SUSPENSION SYSTEM

BACKGROUND OF THE INVENTION

1. Field of the Invention

This invention generally relates to a drawbar arrangement for, and a method of, adjustably interconnectably positioning two wheeled cargo units of a vehicle at any one of a plurality of spacings apart from each other, as well as a remotely controlled suspension system for, and a method of, adjustably positioning a wheeled subframe at any one of a plurality of positions relative to a cargo unit of a vehicle.

2. Description of Related Art

A conventional truck, including a power unit and a van body for holding cargo, is typically pivotably connected by a kingpin assembly at a fixed pivot point to a semi-trailer which holds additional cargo. As considered along the direction of advancement of the vehicle, the van body is sometimes referred to herein as the front or leading cargo unit, while the semi-trailer is sometimes referred to as the rear or trailing cargo unit. The total cargo or payload of these cargo units depends on many factors, including the power unit rating, the type of material used in the construction of the cargo units, and the physical dimensions of each cargo unit.

It is conventional to interconnect the leading and trailing cargo units at a spacing along the longitudinal direction of advancement at a fixed distance on the order of 24 inches. This fixed spacing has been found to be quite satisfactory for highway travel. However, in some applications, for example, for city travel where the street grade is not altogether level, experience has shown that the top of the trailing cargo unit could hit and cause structural damage to the back of the leading cargo unit, particularly to the locking hardware on the top of the rear doors of the leading cargo unit. To prevent such damage, it would be desirable to space the cargo units apart at distances greater than 24 inches.

The fixed 24-inch spacing between the cargo units requires rollover dock plates to be placed on the floor to span the spacing between the leading and trailing cargo units when unloading or loading the same. Also, weather-protective shields must be installed overhead to span the distance between the cargo units. Such additional dock plates and shields must be separately carried on board and, aside from their tendency to be misplaced and lost, reduce the overall payload of the vehicle.

Still another problem associated with a vehicle having a fixed 24-inch spacing between the cargo units is that side doors are required to unload and load the vehicle. A 24-inch spacing is simply not enough for trucking personnel and cargo to fit through with clearance. In any event, many docking areas are designed to load and unload trucks through rear doors and, hence, the use of side doors for this purpose is not altogether desirable.

In order to provide a variable length connection between a pulled trailer and a tandem-connected trailer, the prior art has proposed, for example, in U.S. Pat. No. 4,230,335, a telescoping wheeled dolly. The dolly includes a number of tubes which are telescoped into and out of one another to the desired overall length to adjust the spacing between the trailers. However, such wheeled dollies are not load-bearing arrangements. The weight of the cargo in both trailers is supported entirely by the wheels and is not transferred through the telescoped tubes. Also, there is a considerable amount of lateral sway in such wheeled dolly designs due to the build-up of tolerances caused by the many interfitted tubes.

Related to the selective changing of the overall distance between the cargo units is the selective variation of the weight distribution of the payload relative to the wheels of the vehicle. U.S. Pat. No. 3,834,736 discloses an adjustable kingpin assembly operative for adjustably interconnecting a power unit of a truck and a trailer for varying the load distribution and overall length of the vehicle. Also known in the art are U.S. Pat. Nos. 4,738,462; 3,900,213 and 3,476,405.

SUMMARY OF THE INVENTION

1. Objects of the Invention

It is a general object of this invention to avoid the drawbacks mentioned above for fixed drawbar arrangements having an invariable spacing between leading and trailing cargo units.

It is another object of this invention to adjustably interconnect leading and trailing cargo units at any selected one of a plurality of spacings, each selected for a different function, e.g. one spacing selected for through-loading, another spacing selected for highway driving, still another spacing selected for city driving, and still another spacing selected for unloading.

Another object of this invention is to automatically lock the cargo units apart at the selected spacing.

Still another object of this invention is to unlock the cargo units, either manually or with power assistance, for adjusting the distance between the cargo units to another selected spacing.

Yet another object of this invention is to remotely control the locking/unlocking of the cargo units, and to visually display the status of the locking/unlocking procedure to an operator located in the cab of the vehicle.

A further object of this invention is to interconnect the leading and trailing cargo units so that they can be loaded/unloaded as a single trailer.

A still further object of this invention is to eliminate the use of rollover dock plates, weather-protective shields and side doors.

Another object of this invention is to lower the center of gravity of a vehicle having such a load-bearing arrangement in order to improve fuel mileage.

Still another object of this invention is to lower the turning radius of the leading and trailing cargo units of the vehicle to be comparable to that of a shorter semi-trailer and tractor combination.

Yet another object of this invention is to adjustably interconnect a wheeled subframe at any selected one of a plurality of positions relative to a cargo unit of a vehicle for selective variation of the weight distribution of the payload.

A still further object of this invention is to provide a novel method of adjustably interconnecting not only two wheeled cargo units of a vehicle, but also a method of adjustably interconnecting a wheeled subframe relative to a cargo unit of a vehicle.

2. Features of the Invention

In keeping with these objects, and others which will become apparent hereinafter, one feature of this invention resides, briefly stated, in a load-bearing multi-position drawbar arrangement for adjustably, interconnectably positioning apart from each other, at any selected one of a plurality of spacings, leading and trailing wheeled cargo units of a vehicle as considered along the direction of vehicle advancement.

The arrangement comprises track means stationarily mounted on one of the cargo units, and locking means mounted on the other of the cargo units for joint movement therewith along a longitudinal direction relative to the track means. The track means includes a plurality of apertures spaced apart of one another along the longitudinal direction parallel to the direction of vehicle advancement. The locking means is operative for releasably locking the cargo units together at said selected spacing, and includes at least one locking pin displaceable into and out of a selected one of the apertures that corresponds to the selected spacing.

The arrangement includes actuating means for displacing the locking pin between a locked state in which the pin is displaced into the selected aperture to lock the cargo units apart at the selected spacing, and an unlocked state in which the pin is displaced out of the selected aperture to unlock the cargo units and enable them to be moved to another selected one of the spacings.

According to a preferred embodiment of this invention, one of the selected spacings measures 2 inches along the longitudinal direction and is designed for through-loading/unloading. Another of the selected spacings measures 24 inches and is designed for highway driving by positioning the cargo units in the most aerodynamically-effective mode at highway speeds. Still another one of the selected spacings measures 30 inches and is designed for city driving to enable the units to traverse areas which would be unfeasible for a fixed drawbar arrangement. A further one of the selected spacings measures 42 inches and is designed for unloading the cargo through three points of access, i.e. from either side of the vehicle and, of course, from the rear thereof.

In the preferred embodiment, the track means includes a pair of elongated tracks which extend along the longitudinal direction and which are spaced apart of each other in mutual parallelism along a transverse direction. Each aperture on one of the tracks is aligned along the transverse direction with a respective aperture on the other of the tracks.

Preferably, the locking means is mounted on a carriage mounted on the tracks for sliding movement therealong. The locking means includes at least another locking pin and, in the preferred embodiment, another pair of such locking pins. Each pair of pins is simultaneously displaced by the actuating means into respective aligned pairs of apertures on the tracks.

The locking pins are constantly urged into the locked state by biasing means, preferably constituted by coil springs under tension. The actuating means may be either manually operated, or operated with a power-assist device, or both.

The actuating means includes a shaft journaled on the carriage for turning movement about the longitudinal direction. Two pairs of elongated arms extend in opposite transverse directions. One end of each arm is connected to the shaft. The opposite end of each arm is connected to a respective pin. A first crank link is fixedly mounted on the shaft and extends outwardly thereof to a first offset end. A second crank link is also fixedly mounted on the shaft away from the first crank link, and also extends outwardly of the shaft to a second offset end.

In manual operation, a pull handle including a pull chain is operatively connected to the first offset end of the first crank link. When the pull handle is pulled, the first crank link is turned, as is the shaft, through an angular distance sufficient to pull each pair of arms in opposite directions and, in turn, to pull each pair of pins out of the aligned apertures to the unlocked state.

In the power-assist mode of operation, an electrically powered pneumatic device is operatively connected to the second offset end of the second crank link. The pneumatic device is activated by an electrical solenoid valve. When electrical power is supplied to the valve, the pneumatic unit turns the second crank link and, in turn, the shaft through an angular distance sufficient to pull each pair of arms in opposite directions and, in turn, to pull each pair of pins out of the aligned apertures to the unlocked state.

Still another advantageous feature of this invention resides in providing sensor means for detecting the selected spacing between the cargo units, and indicator means for indicating the detected spacing. The vehicle includes a power unit having a cab in which the operator is seated. The power unit is operatively connected to the leading cargo unit, and is operative for driving the same either forwardly or rearwardly. The sensor means is mounted on the carriage and the trailing cargo unit. Indicator means are mounted on a control console in the cab within sight of the vehicle operator.

In one preferred embodiment, the sensor means includes an elongated sensor strip having a plurality of contact pads spaced apart from one another along the longitudinal direction of the strip at predetermined distances corresponding to the aforementioned selected spacings. A wiper is movable relative to the strip and electrically engages the pads thereon. When the wiper contacts one of the pads, an electrical circuit is completed, thereby energizing the indicator means. The indicator means preferably constitutes a plurality of lamps mounted on the control console, each lamp being associated with a numeral indicative of one of the spacings between the cargo units. The lighting of one of the lamps alerts the operator as to the spacing between the cargo units.

Rather than adjustably positioning the two cargo units relative to each other along the longitudinal direction, another feature of this invention resides in adjustably positioning a wheeled subframe at any selected one of a plurality of multiple positions relative to a cargo unit of a vehicle. This feature enables the subframe to be moved to an optimum position for more uniform weight distribution among the wheels of the vehicle.

Hence, the suspension system according to this invention comprises the above-mentioned track means stationarily mounted on the cargo unit, and the above-mentioned locking means mounted on the wheeled subframe for joint movement therewith. When the above-mentioned actuating means is operated, the aforementioned locking pin is displaced between a locked state and an unlocked state. In the locked state, the cargo unit and the subframe are locked together at the selected position. In the unlocked state, the cargo unit and the subframe are unlocked, thereby enabling the subframe to be moved apart from the cargo unit to another selected one of the positions.

Another advantageous feature of this invention relates to the method of adjustably, interconnectably positioning apart from each other, at any selected one of a plurality of spacings, the leading and trailing cargo units of the vehicle. The method comprises the steps of stationarily mounting the track means on one of the cargo units, and mounting the locking means on the other of the cargo units. Thereupon, by jointly moving the other cargo unit and the locking means thereon relative to one of the cargo units along the longitudinal direction, the cargo units are positioned at a selected one of the spacings. The method includes the steps of locking the cargo units together at the selected spacing, and unlocking the cargo units to enable them to be moved apart to another selected spacing.

Yet another feature of this invention is embodied in the method of adjustably interconnectably positioning a wheeled subframe and a cargo unit relative to each other at any selected one of a plurality of positions. The method comprises the steps of stationarily mounting the track means on the cargo unit, and mounting the locking means on the wheeled subframe. The cargo unit and its track means are thereupon moved relative to the wheeled subframe along the longitudinal direction to a selected one of the positions. The cargo unit and the wheeled subframe are thereupon locked at the selected position and, if desired, may subsequently be unlocked to enable the cargo unit to be moved to another selected position. This latter feature enables the weight distribution of the payload to be adjusted as required.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a side view of a vehicle having leading and trailing cargo units adjustably interconnected by a load-bearing drawbar arrangement according to this invention;

FIG. 2 is a partly broken-away, enlarged isometric view of the drawbar arrangement of FIG. 1;

FIG. 3 is an enlarged, partly broken-away side view of a kingpin assembly at which a forward part of the drawbar arrangement of FIG. 2 is pivotably connected at the rear of the leading cargo unit of FIG. 1;

FIG. 4 is a top plan view of the arrangement of FIG. 2;

FIG. 5 is a broken-away, enlarged, sectional view taken on line 5—5 of FIG. 4 in a locked operational mode;

FIG. 6 is a view analogous to FIG. 5 in a manually-operated unlocked operational mode;

FIG. 7 is a partly broken-away, enlarged, sectional view taken on line 7—7 of FIG. 4 in a locked operational mode;

FIG. 8 is a view analogous to FIG. 7 in a power-assisted unlocked operational mode;

FIG. 9 is an enlarged sectional view taken on line 9—9 of FIG. 2;

FIG. 10 is an enlarged sectional view taken on line 10—10 of FIG. 2;

DETAILED DESCRIPTION OF THE PREFERRED EMBODIMENTS

Figure 11:
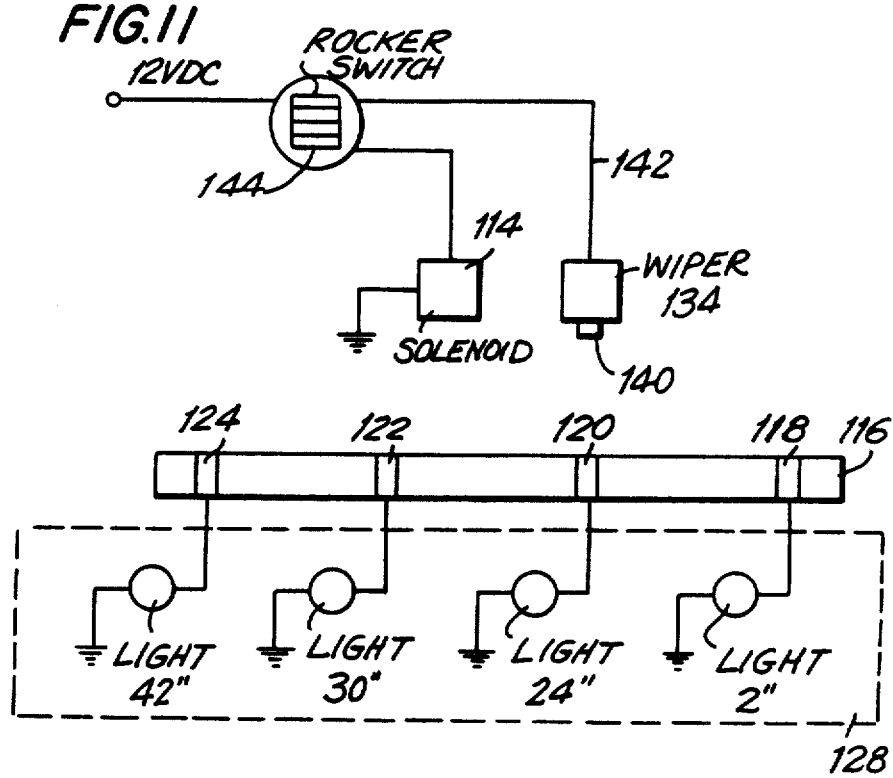
FIG. 11 is an electrical schematic depicting the locking/unlocking operation of the drawbar arrangement.

Referring now to the drawings, reference numeral 10 in FIG. 1 generally identifies a vehicle which includes a power unit 12, a cab 14 for a driver, a cargo-holding van body 16 permanently mounted on and driven by the power unit 12, and a cargo-holding semi-trailer 18 located behind and driven by the van body 16. As considered along the direction of vehicle advancement, the van body 16 and the semi-trailer 18 are hereinafter conveniently referred to as the leading and trailing cargo units, respectively. Each cargo unit has a respective set of wheel assemblies. The rear cargo unit 18 may optionally be provided with front and rear landing gears which are conventional in the trucking industry.

According to this invention, a load-bearing multi-position drawbar arrangement 20 adjustably and interconnectably positions the cargo units 16, 18 apart from each other at any selected one of a plurality of predetermined fixed spacings, each identified by the character "S" in FIG. 1. As will be shown herein, in the preferred embodiment, four such spacings are contemplated. The first measures 2 inches and is primarily used for through-loading and unloading. A 2-inch gap between the cargo units allows forklift trucks, personnel and the like to freely pass from one unit to the other without requiring rollover dock plates on the floor or overhead weather-protective shields.

The second spacing measures 24 inches and is primarily used for highway driving, this being the separation that presents an aerodynamically-streamlined shape to road wind at highway speeds.

The third spacing measures 30 inches and is primarily used for city driving, this being the separation that prevents damage to the rear of the leading unit 16 by the trailing unit 18 when excess street grades are encountered in city streets as described above.

The fourth spacing measures 42 inches and is primarily used for unloading in those situations where multiple points of access are needed or desired to unload the cargo. The 42-inch spacing is large enough to allow unloading not only through the rear of the leading unit 16, but also from either side thereof.

Of course, more or fewer than four predetermined spacings are envisioned by this invention. The specific numeral values mentioned herein for each spacing can be changed to accommodate the different requirements. The specific spacing values mentioned are particularly desirable when used for a vehicle wherein the length of the leading unit is 25 ft. and the length of the trailing unit is 34 ft.

As shown in FIG. 2, the drawbar arrangement 20 includes a pair of rails or tracks 22, 24 transversely spaced apart in mutual parallelism and stationarily mounted below the floor of and at opposite sides of the rear unit 18. A plurality of transversely-spaced-apart floor I-beams, a representative one of which is identified by reference numeral 25 in FIG. 2, are welded to the underside of the floor to support the same, and are also welded to the tracks 22, 24 to rigidly support the latter. A slide carriage 26 is mounted on the tracks 22, 24 for sliding movement lengthwise of the same along a longitudinal direction parallel to the advancement direction of the vehicle. Rubber bumpers 28 are respectively mounted at opposite ends of the tracks and serve as resilient stops to prevent the carriage from moving past the bumpers. As best shown in FIGS. 5–8, each track has a generally C-shaped cross-section with the open ends of each track facing each other. Anti-friction pads 30, preferably made of TEFLON ® (tetrafluoroethylene) are mounted on facing flanges of the tracks and of the carriage to minimize sliding friction during carriage movement. The carriage 26 has a front hollow extension portion 32 centrally located on the carriage 26 between the tracks 22, 24, and extending forwardly toward the leading unit 16. A kingpin 34 is rigidly mounted on the front end of the extension portion 32 and extends vertically downwardly thereof.

As best shown in FIG. 3, the leading cargo unit 16 has a floor 36, the underside of which is rigidly supported by transversely-extending floor I-beams 38 in a manner analogous to that described earlier for I-beams 25 and the floor of the trailing cargo unit 18. The floor I-beams 38 are also welded to a pair of longitudinal chassis rails 40 located at opposite sides of the leading unit 16. An L-shaped support 42 is rigidly connected between and to the chassis rails 40, and includes a platform 44 on which a lower so-called fifth wheel kingpin assembly 46 is supported. The kingpin 34 is inserted into and journaled within a vertical aligned pivot hole in the kingpin assembly 46 for movement about a vertical pivot axis extending lengthwise of the kingpin. The trailing unit is thus driven forwardly or rearwardly by the leading cargo unit and is also free to be articulated and turned about said pivot axis of the kingpin.

A hollow supply conduit 48 extends between the leading unit 16 and the drawbar extension 32. The conduit 48 guides a plurality of service hoses and cables from the power unit 12 through the conduit 48 and into the drawbar extension 32 for servicing the drawbar arrangement with electricity and pressurized air. As best shown in FIG. 2, the hoses and cables include a main air hose 50 for supplying pressurized air, an electrical main cable 52 for supplying electricity, an electrical multi-wire service cable 54 for a sensor described below, and an emergency air hose 56 for supplying emergency pressurized air in the event of failure of the main air hose 50.

As shown in FIGS. 2 and 4, the carriage 26 includes a pair of slide tubes 58, 60, each of rectangular cross-section and slidably mounted on respective tracks 22, 24. The aforementioned anti-friction pads 30 are mounted on upper and lower flanges of the tubes 58, 60 as best shown, for example, in FIGS. 5 and 6. A front cross-member 62, a middle cross-member 64 and a rear cross-member 66 extend transversely in mutual parallelism and interconnect at their opposite ends the slide tubes 58, 60, thereby forming a unitary framework for the carriage.

A shaft 68 is journaled on and extends through holes formed in cross-members 62, 64, 66 for turning movement about a horizontal turning axis along the longitudinal direction. A first connecting link 70 is fixedly mounted by welding on the shaft 68 at the front of the carriage behind the front cross-member 62. A pair of elongated linkage arms 72, 74 extend outwardly and radially of the shaft. The arms 72, 74 have bent ends, and one bent end of each arm is pivotably mounted at opposite sides of the connecting link 70. The other bent end of each arm 72, 74 is operatively connected to respective inner ends of locking pins 76, 78. The locking pins 76, 78 extend through holes formed in the tubes 58, 60 and, when properly aligned with apertures formed in the tracks 22, 24 in a locked state, also extend through such track apertures. A tension coil spring 80 surrounds each locking pin 76, 78, and has one end connected to a respective pin and an opposite coiled end bearing against respective tubes 58, 60. Each spring 80 constantly biases its corresponding pin outwardly.

A second connecting link 82 is also fixedly mounted by welding on the shaft 68 rearwardly of the middle cross-member 64. Another pair of elongated linkage arms 84, 86 extend outwardly and radially of the shaft 68. The arms 84, 86 have bent ends and, analogously to that described earlier, one bent end of each arm 84, 86 is pivotably mounted at opposite sides of the connecting link 82. The other bent end of each arm 84, 86 is operatively connected to respective inner ends of additional locking pins 88, 90. The additional locking pins 88, 90 also extend through the tubes 58, 60 and, when properly aligned with additional apertures formed in the tracks 22, 24 in a locked state, also extend through such additional track apertures. An additional tension coil spring, analogous to that described earlier for spring 80, surrounds each additional locking pin 88, 90, and serves to constantly bias the pins 88, 90 outwardly.

As previously mentioned, the tracks 22, 24 are formed with a plurality of apertures 92 spaced longitudinally along each track. The apertures 92 on track 22 are transversely aligned with the apertures 92 on track 24. Hence, in the locked state shown, for example, in FIG. 4, a first pair of locking pins 76, 78 extend through a first pair of transversely aligned apertures, and a second pair of pins 88, 90 simultaneously extend through a second pair of aligned apertures spaced longitudinally away from the first pair of such apertures. This four-point locking of the carriage by the four locking pins makes for a drawbar with very little lateral sway. In each one of the spacings disclosed above, a different set of four apertures lockingly receives the four locking pins. More or fewer than four locking pins are also contemplated by this invention.

In order to unlock the pins and enable the carriage 26 to be moved from one predetermined spacing to another, this invention proposes using a manually-operated handle and/or a power-assist device which is remotely controlled by the vehicle operator. As best shown in FIGS. 4–6, for the manual operational mode, a pull handle 94 having a dog 96 thereon is mounted on depending supports 98, 100 for pulling displacement relative thereto. The inner end of handle 94 is connected to one end of a pull chain 102 whose opposite end is pivotably connected to an opposite end of a first crank link 104. Crank link 104 is rigidly connected, for example by welding, to the shaft 68 for joint turning therewith.

Starting from the locked position of FIG. 5, one need only pull the outer end of the handle 94 in an outward direction to turn the crank link 104 and the shaft 68 through an angular distance. When the shaft 68 is so turned, each pair of linkage arms 72, 74 and 84, 86 move in the direction of the arrows illustrated in FIG. 6, thereby retracting the locking pins 76, 78 and 88, 90 against the restoring force of the springs 80 until the locking pins are displaced out of the apertures 92 formed in the tracks 22, 24. To maintain the locking pins out of their respective apertures, the handle 94 is moved upwardly so that the dog 96 is positioned into abutment against the support 98. Once the carriage 26 is so unlocked from the tracks, the vehicle operator can drive the power unit 12 and the leading cargo unit 16 forwardly or rearwardly as desired, thereby also moving the carriage 26 forwardly or rearwardly until another desired spacing is reached. Further details concerning this procedure are described below in connection with FIGS. 9–11. Once the new desired spacing is reached, the handle 94 can be lowered so that the dog 96 no longer engages the support 98. The springs 80 now act to automatically return the locking pins to a new locked state corresponding to the new selected spacing.

Rather than employing the just-described manually-operated unlocking mode, the carriage 26 can be automatically unlocked with the aid of a power-assist device. For this purpose, a second crank link 106 is fixedly mounted, for example by welding, on the shaft 68 at a location rearwardly of the first crank link 104. The crank link 106 has an offset end to which an outer end of a threaded drive shaft 108 is pivotably connected. As best shown in FIGS. 7 and 8, the drive shaft 108 is reciprocally driven longitudinally along its length by a pneumatically-operated slave cylinder 110 mounted at the rear of the carriage in a well 112 adjacent the rear cross-member 66. An electrically-operated solenoid valve 114 is also mounted at the rear of the carriage on the member 66. The valve 114 controls the flow of pressurized air from the main air hose 50 to the slave cylinder 110. Electrical power for the valve 114 is supplied by the electrical wire 52.

Starting from the locked position shown in FIG. 7, a vehicle operator need only electrically energize the solenoid 114, as described in further detail below in connection with FIGS. 9–11, to cause the drive shaft 108 to extend away from the cylinder 110 and, in turn, to turn the second crank link 106 and the shaft 68 through an angular distance. When the shaft 68 is so turned, then, in a completely analogous manner to that described earlier for the manual unlocking mode, each pair of linkage arms 72, 74 and 84, 86 move in the direction of the arrows illustrated in FIG. 8 and cause the pins to be retracted against the restoring force of the springs 80 until the pins are clear of the apertures 92. As before, the vehicle operator can drive the power unit either forwardly or rearwardly to a new desired spacing, thereby also moving the unlocked carriage forwardly or rearwardly. Once the new spacing is reached, the vehicle operator can re-actuate the solenoid 114 and the cylinder 110 to retract the drive shaft 108 into the cylinder 110, thereby affirmatively pulling the second crank link 106 back to its original locked position.

The drawbar arrangement also includes a sensor for detecting the spacing, and an indicator for indicating to the vehicle operator the detected spacing between the cargo units. As shown in FIG. 2, the sensor includes a sensor strip 116 on and along which a plurality of electrical contact pads are spaced longitudinally apart from one another. In the preferred embodiment, four such pads 118, 120, 122, 124 respectively correspond to the 2-inch, 24-inch, 30-inch and 42-inch spacings. Each pad is electrically connected to a common harness wire 126 which runs alongside the strip 116, and is one of the cables in the multi-wire service cable 54 that is routed back to a control console 128. As shown in FIG. 11, the console 128 is preferably mounted in the cab on the dashboard within sight of the vehicle operator. A set of lamps is mounted on the console, the lamps being associated with the legends 2", 24", 30", 42". The lighting of one of the lamps visually advises the vehicle operator as to which one of the spacings exists between the cargo units.

As shown in FIG. 9, the sensor strip 116 has a generally flattened C-shaped cross-section, and is mounted underneath, and spans several of, the floor cross-members 25 underlying the floor of the rear cargo unit 18. Bolts or analogous fasteners 130 stationarily support the strip 116. A resilient foam pad 132 is mounted within the strip 116. The contact pads, for example pad 122, are directly mounted on the foam pad 132.

A generally flattened wiper 134 of C-shaped cross-section is fixedly mounted on the carriage 26, preferably by being clamped about upper flanges 136, 138 of front cross-member 62. The wiper 134 is thus jointly movable with the carriage 26. An electrical probe 140 extends upwardly of, and is supported by, the wiper 134. The probe 140 is electrically connected to a wire 142 which is also routed back to the power unit and is one of the cables in the service cable 54. During movement of the carriage 26, the probe 140 slides along the strip 116 and, when it electromechanically engages the pads 118, 120, 122, 124, an electrical circuit is completed which causes a respective one of the lights on the control console to be lit.

A three-position rocker switch 144 is also mounted on the control console. In a so-called "on" position, one of the lights on the console will be lit, thereby indicating the precise spacing existing between the cargo units. In order to adjust the spacing, the vehicle operator should follow the following procedure: First, the brakes on the rear cargo unit 18 should be applied. Next, the transmission in the power unit should be placed in the appropriate gear, and the brakes for the leading cargo unit should be released.

Thereupon, the rocker switch should be moved to the so-called "disengage" position. As shown in FIG. 11, this actuates the solenoid 114 and, in turn, the above-described power-assisted unlocking mode. If power-assist is inoperative or not used, then one can employ the above-described manually-operated unlocking mode.

Once the carriage is unlocked from the tracks, the vehicle operator drives the power unit and the accompanying leading cargo unit forwardly or rearwardly until the desired new spacing is reached. The new spacing will be indicated by the lighting of another light on the console which corresponds to the new spacing. The rocker switch is then moved to a so-called "off" position, thereby signaling the end of the adjustment procedure. The brakes on the rear cargo unit may now be released.

For safety purposes, the vehicle operating positions, namely, the 24-inch and 30-inch lights, may be covered with green lenses. The non-operating positions, namely, the 2-inch and 42-inch lights, may be covered with red lenses.

As a further safety feature, a switch in series with the rocker switch 144 is energized only when the brakes on the trailing cargo unit 18 are applied. Thus, the aforementioned adjustment procedure cannot take place unless the brakes on the trailing cargo unit have been applied.

Figure 12:
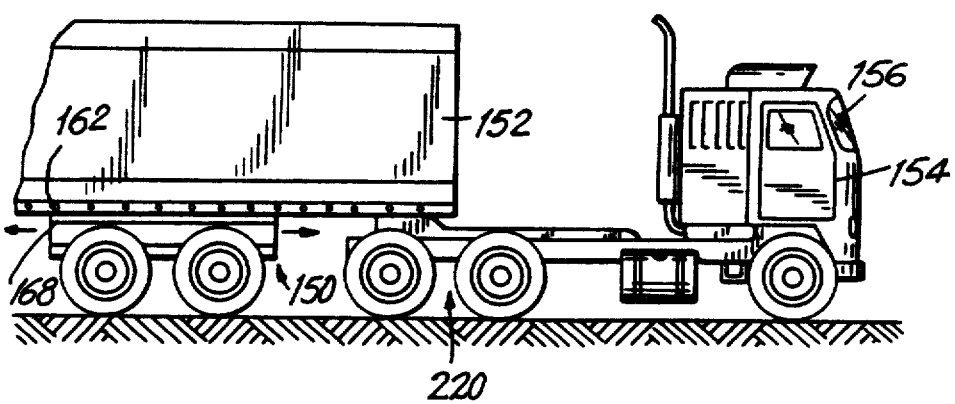
FIG. 12 is a broken-away side view of a vehicle having an adjustable suspension system according to this invention.
Figure 13:
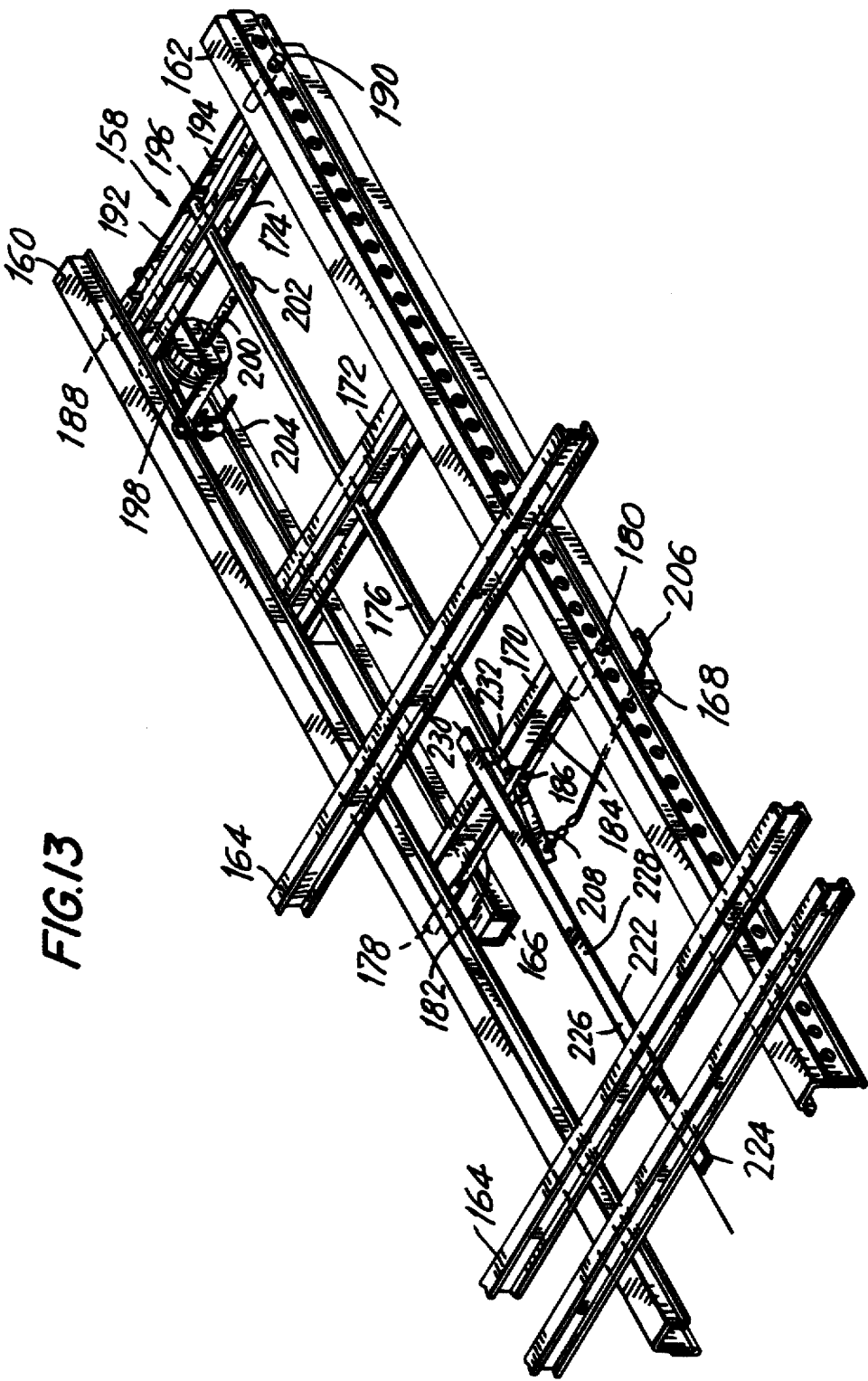
FIG. 13 is a partly broken-away isometric view of the suspension system of FIG. 12.

Turning now to FIGS. 12 and 13, rather than adjustably interconnecting two cargo units relative to each other, another feature of this invention relates to adjustably interconnecting a wheeled subframe 150 relative to a cargo unit 152 of a vehicle. The vehicle includes a power unit 154 and a cab 156. In a completely analogous construction to that described above, a slide carriage 158 is mounted on a pair of apertured tracks 160, 162 for sliding movement therealong. The tracks are supported from above by floor cross-members 164 which underlie the floor of the cargo unit 152. The carriage 158 includes a pair of longitudinal tubes 166, 168 mounted on the tracks 160, 162, respectively. A front cross-member 170, a middle cross-member 172, and a rear cross-member 174 are connected at their respective opposite ends to the tubes 166, 168 to form a unitary framework for the carriage.

A shaft 176 is journaled on the members 170, 172, 174 and, as described above, a first pair of locking pins 178, 180 are operatively connected via a first pair of linkage arms 182, 184 to a first connecting link 186 fixedly mounted on the shaft 176. A second pair of locking pins 188, 190 are operatively connected via a second pair of linkage arms 192, 194 to a second connecting link 196 also fixedly mounted on the shaft 176.

A slave cylinder 198 having a reciprocating drive shaft 200 is operatively connected to a first crank link 202 welded to the shaft 176. A solenoid valve 204 controls the cylinder 198. A pull handle 206 is operatively connected to a second crank link 208 also welded to the shaft 176.

To unlock the carriage 158 from the tracks, one either pulls the handle 206 or remotely operates the slave cylinder 198 from a rocker switch on a control console within the cab. In either event, the pulling of the handle or the operation of the slave cylinder causes one of the crank links and the shaft 176 to be turned through an angular distance, thereby pulling the locking pins out of their respective apertures in the tracks.

The slide tubes 166, 168 are incorporated in the wheeled subframe 150, also called a bogie. When the above-described arrangement is used for positioning the bogie 150 relative to the cargo unit 152 for better weight distribution of a payload in the latter, in the context of a suspension system for the vehicle, the predetermined suspension positions are higher in numerical value than the predetermined spacings described above. In a preferred embodiment, four suspension positions are employed and are 60 inches, 84 inches, 108 inches and 132 inches. These suspension positions represent the fixed distances between the center line of the bogie 150 and the center line of a front set of wheels 220 at the front of the cargo unit (see FIG. 11).

Analogous to sensor strip 116 described earlier, a sensor strip 222 has four contact pads 224, 226, 228, 230. A wiper probe assembly 232 is mounted on the front cross-member 170 of the carriage. The probe assembly makes electromechanical contact with the contact pads. A control console and circuit analogous to that described and illustrated in FIG. 11 completes the system, the only difference being that the legends on the console adjacent to the console lights now indicate the higher numerical values for the suspension positions enumerated above.

In use, to re-position the bogie 150, also known as a tandem axle running gear, to another position so as to alter the payload weight distribution in the cargo unit and, concomitantly, to change the turning radius and off-tracking of the vehicle, the recommended operating procedure is as follows: First, a three-position rocker switch is actuated to an "on" state. One of the lights on the control console will indicate the precise bogie position, namely, 60 inches, 84 inches, 108 inches and 132 inches. Thereupon, the brakes of the bogie are applied. The transmission of the power unit is then placed in an appropriate gear, while the brakes on the power unit are released.

Next, the rocker switch is moved to the "disengage" position, thereby energizing the solenoid 204 and automatically unlocking the locking pins on the sliding bogie. The power unit is then driven forwardly or in reverse until the desired bogie position is achieved, which is indicated by means of the lighting of another of the lights on the control console. When the desired new suspension position has been reached, the rocker switch on the control console is moved to the "off" setting. The bogie brakes may now be released.

Hence, a remotely controlled suspension system has been disclosed which, when activated, offers security and re-positioning ease. Rather than being restricted to just four suspension positions, the tracks may be provided with apertures every four inches along their length, thereby providing a wide range of suspension positions that are adjustable in four-inch increments. This allows variation in the payload weight distribution and a wheel base best suited for any operation as well as acceptable off-tracking characteristics.

It will be understood that each of the elements described above, or two or more together, also may find a useful application in other types of constructions differing from the types described above.

While the invention has been illustrated and described as embodied in a load-bearing multi-position drawbar arrangement and suspension system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A load-bearing, multi-position, drawbar arrangement for adjustably, interconnectably positioning apart from each other, at any selected one of a plurality of spacings, leading and trailing wheeled cargo units of a vehicle, as considered along the direction of vehicle advancement, said arrangement comprising:
 (a) track means stationarily mounted on one of the cargo units, and having a plurality of apertures spaced apart of one another along a longitudinal direction parallel to the direction of vehicle advancement;
 (b) actuatable locking means mounted on the other of the cargo units for joint movement therewith along the longitudinal direction relative to the track means, and operative for releasably locking the cargo units together at said selected spacing, said locking means including at least one locking pin displaceable into and out of a selected one of the apertures that corresponds to said selected spacing;
 (c) actuating means for displacing said at least one locking pin between a locked state in which said at least one locking pin is displaced into said selected aperture to lock the cargo units apart at said selected spacing, and an unlocked state in which said at least one locking pin is displaced out of said selected aperture to unlock the cargo units and enable the cargo units to be moved to another selected one of the spacings.

(d) a carriage mounted upon said track means for slidable movement therealong, said locking means being mounted on said carriage; and wherein said actuating means comprises power-assist means and said actuating means comprises a shaft journaled on the carriage for turning movement about the longitudinal direction; a pair of elongated arms extending in opposite transverse directions, each arm having one end connected to the shaft, and another end connected to a respective pin; a crank link fixedly mounted on the shaft and extending outwardly thereof to an offset end such that, in a locked position, said shaft, said elongated arms, said locking pins, and said apertures are substantially at the same height and are traversed by a common horizontal plane; an electrically-powered pneumatic device operatively connected to the offset end and operative, when electrical power is supplied to the pneumatic device from a remote activator, to turn the crank link and, in turn, the shaft through an angular distance sufficient to pull the arms in opposite directions and, in turn, to pull the pins out of the aligned apertures to the unlocked state.

2. The drawbar arrangement according to claim 1, wherein the track means includes a pair of elongated tracks extending along the longitudinal direction and transversely spaced apart from each other; and wherein a first group of said apertures are spaced apart of one another on one of the tracks, and wherein a second group of said apertures are spaced apart of one another on the other of the tracks, and wherein each aperture of the first group is aligned along the transverse direction with each aperture of the second group.

3. The drawbar arrangement according to claim 2, wherein the trailing cargo unit has a floor, said floor having an underside on which the tracks are stationarily mounted.

4. The drawbar arrangement according to claim 2, wherein the locking means is mounted on a carriage mounted on the tracks for sliding movement therealong; and further comprising anti-friction means between the carriage and the tracks for minimizing sliding friction between the carriage and the tracks, and stop means at opposite ends of the tracks for preventing movement of the carriage past the track ends.

5. The drawbar arrangement according to claim 2, wherein the locking means is mounted on a carriage mounted on the tracks for sliding movement therealong, and wherein the locking means is mounted on the carriage and includes at least another locking pin identical to said at least one locking pin, said actuating means being operative for displacing said pins into an aligned pair of apertures of the first and second groups in the locked state, and for displacing said pins out of the aligned pair of apertures in the unlocked state.

6. The drawbar arrangement according to claim 5, wherein the actuating means includes biasing means for constantly urging the locking pins into the locked state.

7. The drawbar arrangement according to claim 5, wherein the locking means includes another pair of locking pins identical to said first-mentioned pair of locking pins, said actuating means being operative for simultaneously displacing each pair of pins into two different aligned pairs of apertures in the locked state, and for simultaneously displacing each pair of pins out of the different aligned pairs of apertures in the unlocked state; and wherein the pairs of locking pins are spaced apart along the longitudinal direction.

8. The drawbar arrangement according to claim 5, wherein the leading cargo unit has a floor below which a kingpin assembly is mounted, and wherein the carriage has a leading end pivotably connected to the kingpin assembly.

9. The drawbar arrangement according to claim 1; and further comprising sensor means for detecting the selected spacing between the cargo units, and energizable indicator means for indicating the detected spacing between the cargo units.

10. The drawbar arrangement according to claim 9, wherein the track means is stationarily mounted on the trailing cargo unit, and further comprising a carriage on which the locking pin is mounted, and wherein the carriage is mounted on, and is movable with, the leading cargo unit; and wherein the vehicle includes a power unit having a cab and operatively connected to the leading cargo unit for driving the same; and wherein the sensor means is mounted on the carriage and the trailing cargo unit; and wherein the indicator means is mounted in the cab.

11. The drawbar arrangement according to claim 10, wherein the sensor means includes an elongated sensor strip extending along the longitudinal direction, and having a plurality of contact pads spaced apart of one another along the strip at distances corresponding to said spacings, and a wiper movable relative to the strip into electrical engagement with the pads thereon; and wherein the indicator means is energized when the wiper contacts at least one of the pads.

12. The drawbar arrangement according to claim 11, wherein the indicator means includes a plurality of lamps mounted on a control panel in the cab, and wherein each lamp is associated with a numeral on the control panel indicative of one of the spacings between the cargo units, and wherein the lamp associated with the numeral corresponding to the selected spacing is lit when the wiper contacts the pad associated with said selected spacing.

13. The drawbar arrangement of claim 1 wherein said carriage comprises a pair of slide tubes, each slide tube being of substantially rectangular cross-section and being mounted on said track means.

14. A remotely-controlled suspension system for adjustably positioning a wheeled subframe at any selected one of a plurality of multiple positions relative to a cargo unit of a vehicle, comprising:

(a) track means stationarily mounted on the cargo unit, and having a plurality of apertures spaced apart of one another along a longitudinal direction parallel to the direction of vehicle advancement;

(b) actuatable locking means mounted on the wheeled subframe for joint movement therewith along the longitudinal direction relative to the track means, and operative for releasably locking the wheeled subframe to the cargo unit at said selected position, said locking means including at least one locking pin displaceable into and out of a selected one of the apertures that corresponds to said selected position;

(c) actuating means for displacing said at least one locking pin between a locked state in which said at least one locking pin is displaced into said selected aperture to lock the cargo unit and the subframe at said selected position, and an unlocked state in which said at least one locking pin is displaced out of said selected aperture to unlock the cargo unit and the subframe and enable the cargo unit to be moved from the subframe to another selected one of the positions; and (d) a carriage mounted upon said tracks for slidable movement therealong, said locking means being mounted on said carriage; and wherein said actuating means comprises power-assist means and said actuating means comprises a shaft journaled on the carriage for turning movement about the longitudinal direction; a pair of elongated arms extending in opposite transverse directions, each arm having one end connected to the shaft, and another end connected to a respective pin; a crank link fixedly mounted on the shaft and extending outwardly thereof to an offset end such that, in a locked position, said shaft, said elongated arms, said locking pins, and said apertures are substantially at the same height and are traversed by a common horizontal plane; an electrically-powered pneumatic device operatively connected to the offset end and operative, when electrical power is supplied to the pneumatic device from a remote activator, to turn the crank link and, in turn, the shaft through an angular distance sufficient to pull the arms in opposite directions and, in turn, to pull the pins out of the aligned apertures to the unlocked state.

15. The system according to claim 14, wherein the track means includes a pair of elongated tracks extending along the longitudinal direction and transversely spaced apart from each other; and wherein a first group of said apertures are spaced apart of one another on one of the tracks, and wherein a second group of said apertures are spaced apart of one another on the other of the tracks, and wherein each aperture of the first group is aligned along the transverse direction with each aperture of the second group.

16. The system according to claim 15, wherein the locking means is mounted on a carriage mounted on the tracks for sliding movement therealong, and wherein the locking means is mounted on the carriage and includes at least another locking pin identical to said at least one locking pin, said actuating means being operative for displacing said pins into an aligned pair of apertures of the first and second groups in the locked state, and for displacing said pins out of the aligned pair of apertures in the unlocked state.

17. The system according to claim 16, wherein the actuating means includes biasing means for constantly urging the locking pins into the locked state.

18. The system according to claim 14; and further comprising sensor means for detecting the selected position, and energizable indicator means for indicating the detected position.

19. The system according to claim 18; wherein the track means is stationarily mounted on the cargo unit, and further comprising a carriage on which the locking pin is mounted, and wherein the carriage is mounted on, and is movable with, the wheeled subframe; and wherein the vehicle includes a power unit having a cab and operatively connected to the cargo unit for driving the same; and wherein the sensor means is mounted on the carriage and the cargo unit; and wherein the indicator means is mounted in the cab.

20. The system according to claim 19, wherein the sensor means includes an elongated sensor strip extending along the longitudinal direction, and having a plurality of contact pads spaced apart of one another along the strip at distances corresponding to said positions, and a wiper movable relative to the strip into electrical engagement with the pads thereon; and wherein the indicator means is energized when the wiper contacts at least one of the pads.

21. The system according to claim 20, wherein the indicator means includes a plurality of lamps mounted on a control panel in the cab, and wherein each lamp is associated with a numeral on the control panel indicative of one of the selected positions, and wherein the lamp associated with the numeral corresponding to the selected position is lit when the wiper contacts the pad associated with said selected position.

22. The drawbar arrangement of claim 14 wherein said carriage comprises a pair of slide tubes, each slide tube being of substantially rectangular cross-section and being mounted on said track means.

23. A multi-position arrangement for adjustably, interconnectably positioning relative to each other, at any selected one of a plurality of positions, wheeled units of a vehicle, comprising:

(a) track means stationarily mounted on one of the wheeled units, and having a plurality of apertures spaced apart of one another along a longitudinal direction parallel to the direction of vehicle advancement;

(b) actuatable locking means mounted on the other of the wheeled units for joint movement therewith along the longitudinal direction relative to the track means, and operative for releasably locking the wheeled units together at said selected position, said locking means including at least one locking pin displaceable into and out of a selected one of the apertures that corresponds to said selected position; and (c) actuating means for displacing said at least one locking pin between a locked state in which said at least one locking pin is displaced into said selected aperture to lock the wheeled units at said selected position, and an unlocked state in which said at least one locking pin is displaced out of said selected aperture to unlock the wheeled units and enable the latter to be moved relative to one another to another selected one of the positions wherein said actuating means comprises power-assist means including a remote actuator and said actuating means comprises a shaft journaled on the carriage for turning movement about the longitudinal direction, a pair of elongated arms extending in opposite transverse directions, each arm having one end connected to the shaft, and another end connected to a respective pin; a crank link fixedly mounted on the shaft and extending outwardly thereof to an offset end such that, in a locked position, said shaft, said elongated arms, said locking pins, and said apertures are substantially at the same height and are traversed by a common horizontal plane; a electrically-powered pneumatic device operatively connected to the offset end and operative, when electrical power is supplied to the pneumatic device from a remote activator, to turn the crank link and, in turn, the shaft through an angular distance sufficient to pull the arms in opposite directions and, in turn, to pull the pins out of the aligned apertures to the unlocked state.

24. The drawbar arrangement of claim 23 wherein said carriage comprises a pair of slide tubes, each slide tube being of substantially rectangular cross-section and being mounted on said track means.

25. A load-bearing, multi-position, drawbar arrangement for adjustably, interconnectably positioning apart from each other, at any selected one of a plurality of spacings, leading and trailing wheeled cargo units of a vehicle, as considered along the direction of vehicle advancement, said arrangement comprising:
   (a) track means stationarily mounted on one of the cargo units, and having a plurality of apertures spaced apart of one another along a longitudinal direction parallel to the direction of vehicle advancement;
   (b) actuatable locking means mounted on the other of the cargo units for joint movement therewith along the longitudinal direction relative to the track means, and operative for releasably locking the cargo units together at said selected spacing, said locking means including at least one locking pin displaceable into and out of a selected one of the apertures that corresponds to said selected spacing;
   (c) actuating means for displacing said at least one locking pin between a locked state in which said at least one locking pin is displaced into said selected aperture to lock the cargo units apart at said selected spacing, and an unlocked state in which said at least one locking pin is displaced out of said selected aperture to unlock the cargo units and enable the cargo units to be move to another selected one of the spacings;
   (d) sensor means connected to said vehicle for detecting the selected spacing between the cargo units;
   (e) energizable indicator means within a control console means attached to the leading vehicle for indicating the spacing detected by said sensor means; and
   wherein the sensor means comprises an enlongated sensor strip mounted on said vehicle and extending along the longitudinal direction of said vehicle, a plurality of contact pads spaced apart from one another along said strip at distances corresponding to said plurality of spacing, and a wiper fixed mounted on a carriage means while being movable relative to the strip into electrical engagement with the pads thereon, and wherein said indicator means is energized when said wiper contacts at least one of said pads.

26. The drawbar arrangement according to claim 25, further comprising a carriage on which said locking means is mounted, said carriage being mounted on and being movable with said leading cargo unit, and wherein said track means is stationarily mounted on said trailing cargo unit, and further comprising said vehicle including a power unit having a cab and being operatively connected to said leading cargo unit for driving it, and wherein said indicator means is mounted in said cab.

27. The drawbar arrangement according to claim 26, wherein the indicator means includes a plurality of lamps mounted on a control panel in said cab, and wherein each lamp is associated with a numeral in the control panel indicative of one of the spacings between the cargo units, and wherein the lamp associated with the numeral corresponding to the selected spacing is lit when the wiper contacts the pad associated with said selected spacing.

28. A remotely-controlled suspension system for adjustably positioning a wheeled subframe at any selected one of a plurality of multiple positions relative to a cargo unit of a vehicle, comprising:
   (a) track means stationarily mounted on the cargo unit, and having a plurality of apertures spaced apart of one another along a longitudinal direction parallel to the direction of vehicle advancement;
   (b) actuatable locking means mounted on the wheeled subframe for joint movement therewith along the longitudinal direction relative to the track means, and operative for releasably locking the wheeled subframe to the cargo unit at said selected position, said locking means including at least one locking pin displaceable into and out of a selected one of the apertures that corresponds to said selected position;
   (c) actuating means for displacing said at least one locking pin between a locked state in which said at least one locking pin is displaced into said selected aperture to lock the cargo unit and the subframe at said selected position, and an unlocked state in which said at least one locking pin is displaced out of said selected aperture to unlock the cargo unit and the subframe and enable the cargo unit to be moved from the subframe to another selected one of the positions;
   (d) sensor means connected to said vehicle for detecting the selected position;
   (e) energizable indicator means within a control console means attached to the leading vehicle for indicating the position detected by said sensor means; and
   wherein the sensor means comprises an elongated sensor strip mounted on said vehicle and extending along the longitudinal direction of said vehicle, a plurality of contact pads spaced apart from one another along said strip at distances corresponding to said plurality of positions, and a wiper fixedly mounted on a carriage means while being movable relative to the strip into electrical engagement with the pads thereon, and wherein said indicator means is energized when said wiper contacts at least one of said pads.

29. The drawbar arrangement according to claim 28, further comprising a carriage on which said locking means is mounted, said carriage being mounted on and being movable with said wheeled subframe, and wherein said track means is stationarily mounted on said cargo unit, and further comprising said vehicle including a power unit having a cab and being operatively connected to said leading cargo unit for driving it, and wherein said indicator means is mounted in said cab.

30. The drawbar arrangement according to claim 29, wherein the indicator means includes a plurality of lamps mounted on a control panel in said cab, and wherein each lamp is associated with a numeral on the control panel indicative of one of the spacings between the cargo units, and wherein the lamp associated with the numeral corresponding to the selected spacing is lit when the wiper contacts the pad associated with said selected spacing.

* * * * *